United States Patent [19]

Anderson et al.

[11] Patent Number: 4,875,619

[45] Date of Patent: Oct. 24, 1989

[54] BRAZING OF INK JET PRINT HEAD COMPONENTS USING THIN LAYERS OF BRAZE MATERIAL

[76] Inventors: Jeffrey J. Anderson, 12540 SW. Edgewood, Portland, Oreg. 97225; John S. Moore, 15087 NW. Oakmont Loop, Beaverton, Oreg. 97005

[21] Appl. No.: 239,587

[22] Filed: Sep. 1, 1988

[51] Int. Cl.$^4$ .............................................. B23K 20/00
[52] U.S. Cl. .................................... 228/190; 228/195; 228/206; 228/209; 228/254; 228/263.15
[58] Field of Search ........................ 228/190, 193–195, 228/206, 209, 233, 234, 254, 263.15, 103, 104

[56] References Cited

U.S. PATENT DOCUMENTS

| | | |
|---|---|---|
| 3,530,568 | 9/1970 | Owczarski et al. . |
| 4,150,776 | 4/1979 | Lesgourgues ...................... 228/194 |
| 4,392,145 | 7/1983 | Pakola . |
| 4,460,906 | 7/1984 | Kanayama . |
| 4,685,185 | 8/1987 | Boso et al. . |
| 4,728,969 | 3/1988 | Le et al. . |

FOREIGN PATENT DOCUMENTS

| | | | |
|---|---|---|---|
| 188561 | 11/1983 | Japan .................................. | 228/193 |
| 130003 | 10/1984 | Japan .................................. | 228/193 |
| 9985 | 1/1986 | Japan .................................. | 228/193 |
| 2167320A | 11/1985 | United Kingdom . | |

OTHER PUBLICATIONS

Article entitled "Advanced Diffusion-Welding Processes" by W. A. Owczarski and D. S. Duvall, Pratt & Whitney Aircraft Division, United Technologies Corp., East Hartford, Connecticut. Source: *New Trends in Materials Processing*, ASM, 1976.
Article entitled "Use of Electrodeposition to Provide Coatings for Solid State Bonding" by J. W. Dini. Source: *Welding Journal*, Nov., 1982.
Article entitled "High Strength Diffusion Welding of Silver Coated Base Metals" by M. O'Brien, C. R. Rice and D. L. Olson. Source: *Welding Journal*, Jan. 1976.
Article entitled "Use of Electrodeposited Silver as an Aid in Diffusion Welding" by J. W. Dini, W. K. Kelley, W. C. Cowden and E. M. Lopez. Source: *Welding Research Supplement*, Jan. 1984.
Article entitled "TLP Bonding: a New Method of Joining Heat Resistant Alloys" by D. S. Duvall, W. A. Owczarski and D. F. Paulonis. Source: *Welding Journal*, Apr. 1974.
Article entitled "Processes-Introduction to Diffusion Bonding" by P. M. Bartle. Source: Metal Construction and British Welding Journal, May, 1969.
Article entitled "Diffusion Welding of Steel in Air" by E. G. Signes. Source: Welding Research Supplement, Dec. 1968.
Article entitled "Mechanism of Solid State Pressure Welding" by H. A. Mohamed and J. Washburn. Source: *Welding Research Supplement*, Sep., 1975.
Article entitled "Diffusion Bonding of Metals" by W. M. Spurgeon, S. K. Rhee and R. S. Kiwak. Source: *Bendix Technical Journal*, Spring, 1969.
Article entitled "Eutectic Bonding of Prescision Metal Parts", by E. R. Beldeman, W. R. Cann, J. J. Meglemre. Source: North American Aviation, Inc.

Primary Examiner—Nicholas P. Godici
Assistant Examiner—Samuel M. Heinrich
Attorney, Agent, or Firm—David P. Petersen; Robert S. Hulse

[57] ABSTRACT

A first surface of a first metal component of an ink jet print head is bonded to a second surface of a second metal component of the ink jet print head, the first and second surfaces being of materials having the same or similar coefficients of thermal expansion. A layer of filler material is electroplated or otherwise placed on at least one of these surfaces. The filler material has a melting point which is below the melting point of the first and second components, and the total thickness of the filler material on the surfaces together is in the range of from approximately one-sixteenth micron to approximately five microns, with one-eighth micron to two microns being a preferred range. These surfaces are placed together and brazed under low pressure. Preferably, the braze pressure is from about one-half psi to no more than about one hundred psi, with about ten psi being most preferred.

14 Claims, 1 Drawing Sheet

BRAZING OF INK JET PRINT HEAD COMPONENTS USING THIN LAYERS OF BRAZE MATERIAL

TECHNICAL FIELD

The present invention relates to a method of making ink jet print heads involving the bonding together of surfaces of components of the ink jet print heads by low pressure brazing using a thin layer of filler material.

BACKGROUND OF THE INVENTION

Heretofore ink jet print heads of various types have been produced, including both non-air-assisted and air-assisted drop-on-demand and continuous ink jet print heads. As exemplified by the ink jet print heads of U.S. Pat. No. 4,685,185 of Boso et al. and U.S. Pat. No. 4,728,969 of Le et al., ink jet print heads frequently are formed of plural metal laminates or components which are secured together.

These ink jet print heads typically have ink supply conduits through the laminates and the laminates normally define one or more compartments for receiving ink. In addition, air-assisted ink jet print heads include air flow passageways through the laminates. Also, as shown by the aforementioned Le et al. patent, some ink jet print heads may have purging passageways. In addition, these ink jet print heads typically have ink droplet ejection plates with minute ink orifice outlets, for example, thirty to eighty microns in diameter, through which ink drops are ejected. In air-assisted ink jet print heads, these ink drops typically pass through an air chamber and exit from an external orifice in an air chamber plate under the assist of air flowing from the air chamber.

During manufacture, the various ink jet print head orifices and passageways must not be occluded. A more stringent requirement for array ink jet print heads is that the passageways must not be even partially occluded because if they are the various jets can have different performance characteristics. In air-assisted ink jets, it is also important for the ink-drop-forming orifice outlet and external orifice to be accurately aligned, typically concentric with one another to within three microns, for accurate ink drop ejection. In addition, bending, deformation or distortion of the ink droplet ejection plate, and of the air chamber plate in the case of air-assisted ink jet print heads can interfere with the accurate directional ejection of ink drops from the ink jet print head. Also, performance of ink jet print head arrays is adversely affected by rotation of the ejection plate relative to other components of the ink jet print head and relative to the air chamber plate in the case of air-assisted ink jet print heads. Also, relative rotation of plates forming an ink jet print head during manufacture can result in the misalignment of orifices and passageways in the ink jet print head.

In a common ink jet print head manufacturing technique for air-assisted ink jets, attachment of various laminates forming the ink jet print head is performed under a microscope with a worker aligning the various orifices as the ink jet print head is assembled. It has proven difficult to maintain the various ink jet print head components in alignment as these components are attached. Therefore, the yield of satisfactory ink jet print heads from such a technique is in need of improvement.

The Boso et al. patent attempts to overcome this alignment problem by forming a number of the apertures, for example an ink orifice outlet and an orifice between a horn compartment and an ink compartment, after plates or laminates containing these orifices are mounted in place. In addition, in the case of air-assisted ink jet print heads, Boso et al. optionally forms the external orifice prior to mounting the air chamber plate in position.

At Column 8, Lines 46–63, the Boso et al. patent discloses that steps for attaching the various ink jet print head components can comprise a brazing step. Nickel-gold alloy braze rings are mentioned. During melting of these braze rings, Boso, et al. recites that there is some diffusion of the gold and nickel into adjacent stainless steel components of the ink jet print head. This diffusion changes the percentage composition of the alloy and raises its re-melting temperature. Consequently, during a subsequent brazing operation, previously brazed joints do not melt because the temperatures at the joint are below the re-melting temperature. Finally, Boso et al. mentions that a spacer utilized in the described ink jet print head can be coated with an electroformed or electroplated layer of silver braze material.

The braze rings used by Boso et al. for each layer were from 25 to 75 microns or more in thickness. In addition, the Boso et al. brazing steps were accomplished with a pressure of approximately eighty pounds per square inch being applied in a direction normal to the plane of the various ink jet print head components during the brazing operations. Ink jet print heads of the Boso et al. construction have been sold for more than one year.

The Boso et al. approach is relatively time consuming and expensive because of the amount of brazing material used and because of the need to form apertures following the mounting of the various ink jet print head components. In Boso et al., if the ink jet orifice were formed prior to brazing, the braze material could easily accumulate in and occlude these tiny apertures.

Therefore, a need exists for an improved method of manufacturing ink jet print heads which is directed toward overcoming these and other disadvantages of prior art approaches.

SUMMARY OF THE INVENTION

In accordance with one aspect of the present invention, a first surface of a first metal component of an ink jet print head is bonded to a second surface of a second metal component of the ink jet print head, the first and second surfaces being of materials having the same or similar coefficients of thermal expansion. A layer of filler material is electroplated or otherwise placed on at least one of these surfaces. The filler material has a melting point which is below the melting point of the first and second components, and the total thickness of the filler material on the surfaces together is in the range of from approximately one-sixteenth micron to approximately five microns, with one-eighth micron to two microns being a preferred range. These surfaces are placed together and brazed under low pressure. Preferably, the braze pressure is from about one-half psi to no more than about 100 psi, with about 10 psi being most preferred. As the amount of filler material increases above about 5 microns, the components tend to become misaligned during brazing and the orifices tend to occlude. Also, at a pressure of greater than 100 psi, these problems of misalignment of orifices may become acute. Typically, if more than one micron of filler material is used, the components are heated to a temperature below the braze temperature to permit diffusion of the filler material until no more than about one micron of filler material remains. Thereafter, the temperature is raised to melt the remaining filler material to braze the components.

Because only a very thin layer of filler is used, after the braze step, substantial regions of the joint may exhibit none of the pure braze metal or alloy. Rather, this braze material may have either diffused into or alloyed with the base metal so that the geometric location of the joint appears in cross-section micrographs to be indistinguishable from the surrounding base metal. If the time during which the components are held at the braze temperature is sufficiently long, and if the diffusion coefficient of the braze metal into the base metal is sufficiently high, then none of the pure braze metal will remain and the joint region will appear like the surrounding base metal.

In accordance with another aspect of the present invention, the filler material is selected from a group comprising gold, copper, silver, nickel and binary and ternary combinations of these materials. These materials, and binary and ternary combinations of these materials with other materials, such as, for example, nickel-phosphorus, are suitable fillers. If the filler is of or includes a material which does not diffuse into the particular substrate material being used for the component, then no greater than about one micron of the low diffusible material is included in the filler. For example, if a silver inclusive filler material is used to bond stainless steel components, no greater than a total of approximately one micron of the silver portion of the filler material is placed on the first and second surfaces together. In addition, with the approach of the present invention, extremely strong bonds can be obtained when approximately one-eighth micron to one-half micron total of the filler material is used. These bonds have been observed to have about two-thirds of the tensile strength of the substrate material of the first and second components being joined together.

In corrosive environments, such as can be encountered by ink jet print head components in contact with some types of ink, the ink jet print head components are frequently manufactured of stainless steel. In such a case, the oxide is removed from the stainless steel components prior to the brazing step.

It is, accordingly, one object of the present invention to provide an improved method of manufacturing ink jet print heads of two or more interconnected components.

It is another object of the present invention to provide a method of manufacturing ink jet print heads which minimizes the possible clogging or even partial occluding of orifices, chambers or passageways during manufacture, especially orifices of a small cross-sectional dimension.

Another object of the present invention is to provide a method of manufacturing ink jet print heads with no fluid leaks between adjacent but separated chambers within the ink jet print head and no fluid leaks to the external environment.

A further object of the present invention is to provide a method of manufacturing ink jet print heads which minimizes the possibility of potential bubble-trapping crevices remaining between the interconnected components or laminates forming the ink jet print head.

A still further object of the present invention is to provide a method of manufacturing an ink jet print head which minimizes time, the number of steps, and the cost of materials used in manufacturing.

A further object of the present invention is to provide a method of manufacturing a strong and durable ink jet print head from plural components.

Another object of the present invention is to provide a method of manufacturing an ink jet print head which minimizes the distortion of metal components included in the ink jet print head and which permits the control of the alignment and spacing of the components within extremely tight tolerances.

Still another object of the present invention is to provide a method of bonding components, which can be of a complex geometry, to form an ink jet print head and which minimizes the need for conventional machining of components included in the ink jet print head.

Another object of the present invention is to provide a method of manufacturing a variety of ink jet print heads, including relatively large ink jet print heads that contain arrays of ink jets.

These and other objects, features and advantages of the present invention will become apparent with reference to the following detailed description and drawings.

DETAILED DESCRIPTION OF PREFERRED EMBODIMENTS

For purposes of convenience, the method of the present invention will be described in conjunction with the manufacture of one form of an ink jet print head shown in FIG. 1 and as described in greater detail in U.S. Pat. No. 4,728,969 of Le et al. It is to be understood that the method is not limited to the manufacture of this particular type of ink jet print head. Instead, the method has broad applicability to ink jet print head manufacture in general where two or more metal components are to be bonded together. The method can be used to make ink jet print heads which dispense inks that are liquid at room temperature as well as hot melt or phase change inks that are solid at room temperature and which are melted for ejection. For example, the method of the present invention can be used to fabricate relatively large ink jet print heads with an array of ink-drop-ejecting orifices, although the method becomes more difficult to use as the size of the ink jet print heads increases.

Figure 1:
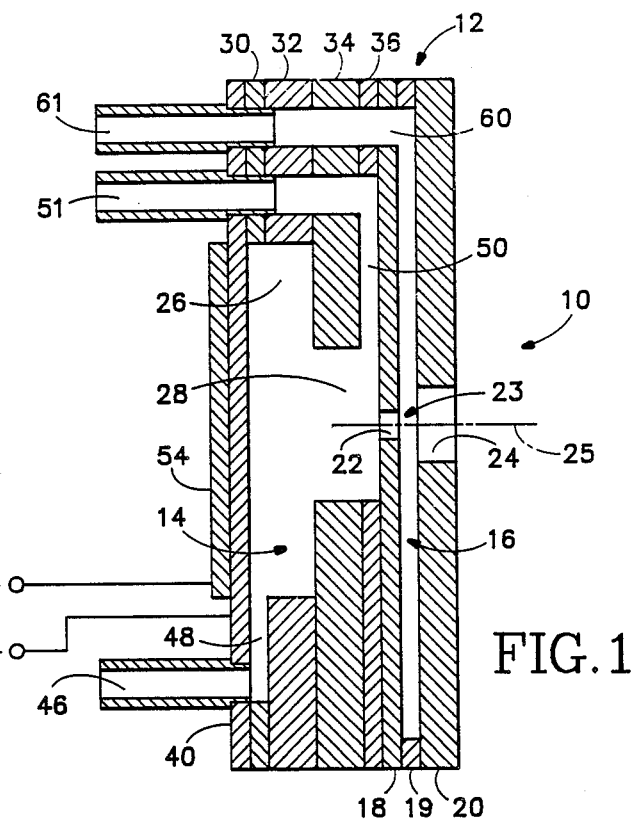
FIG. 1 is a vertical sectional view of one form of an ink jet print head made in accordance with the method of the present invention.

Referring to FIG. 1, an ink jet print head 10 includes a body 12 within which a single compartment ink chamber 14 and an air chamber 16 are provided. The ink chamber 14 is separated from the air chamber 16 by an ink chamber wall 18. Also, the sides of the air chamber 16 are bounded by an air chamber spacer plate 19 and the air chamber 16 is closed by an air chamber wall 20. The ink chamber 14 communicates with the air chamber 16 through an internal ink orifice passageway or aperture 22, which is provided through the ink chamber wall 18. Ink orifice passageway 22 is typically very small, for example, from about thirty to eighty microns in diameter. The ink orifice passageway 22 opens to air chamber 16 through an internal ink drop-forming orifice outlet 23. An external ink jet orifice or aperture 24 passes from the air chamber to the exterior of the ink jet print head 10. The external orifice 24 is also extremely small, for example from about one hundred and ten to two hundred and sixty microns in diameter. In addition, the distance between the plates 18 and 20, and thus the width of the air chamber 16, is typically about fifty to one hundred and twenty microns. The ink jet orifice 24 is axially aligned, and concentric with ink orifice passageway 22 and orifice outlet 23 to within about three microns, as indicated by axis 25.

In the FIG. 1 form of ink jet print head, the ink chamber 14 is comprised of two sections 26, 28 of generally circular cross section. The ink chamber sections 26, 28 are formed by providing ink chamber openings through respective laminations or components 30, 32, 34 and 36 and joining these components together so as to bound the respective sides of the chamber sections. The chamber section 28 is positioned adjacent to the wall 18 and the ink orifice passageway 22. Ink chamber section 26 is of a greater diameter than section 28 and is closed by a flexible diaphragm plate 40 mounted to the component or lamination 30 at the opposite end of the ink chamber from ink orifice passageway 22.

Ink is delivered to an ink receiving inlet 46, flows through an ink passageway or aperture 48, and fills the ink chamber 14 within the ink jet print head.

As an optional feature, the illustrated FIG. 1 ink jet print head has a purging outlet 51 which communicates through a purging passageway or aperture 50 with the chamber section 28. The purging passageway is normally closed, but is selectively opened to permit the flow of ink from the ink chamber 14 through the purging passageway to remove any bubbles and contaminants that may be present in the ink chamber. The purging passageway is defined by aligned openings in the plates 40, 30, 32, 34 and 36.

A piezoelectric ceramic element 54 plated on both sides with metal and bonded to diaphragm 40, comprise one form of a pressure-pulse-generating actuator. In response to electrical pulses, such as represented by $V_0$ in FIG. 1, the diaphragm deflects slightly into the pressure chamber 26, and a pressure pulse is transmitted from diaphragm 40 through the ink chamber 14. This causes the ejection of an ink drop from the ink drop-forming orifice outlet 23 and toward the external orifice 24.

Because the FIG. 1 form of ink jet print head is an air-assisted ink jet print head, pressurized air is delivered to an air inlet 61 of the ink jet print head 10. This pressurized air flows through an air supply passageway or aperture 60 to the air chamber 16. Air is distributed about the circumference of the ink jet print head between the outer surface of the ink chamber wall 18 and the inner surface of the air chamber wall 20. More specifically, air flows inwardly from all directions through the air chamber 16 toward the center of the ink jet print head. As air approaches the center of the ink jet print head, it changes direction and flows outwardly through the external orifice 24. This air flow accelerates ink drops generated at ink drop-forming orifice. 23 in response to pressure pulses and assists in carrying them outwardly from the ink jet print head. As a result, uniform and symmetric ink drops are generated by the ink jet print head. These drops travel through the external orifice 24 and toward printing medium (not shown).

Ink jet print heads of this type have passageways which are of a very small size and are typically manufactured using laminates or components that can be extremely thin. For example, in addition to the dimensions previously mentioned, the passageways 48 and 50 are typically about one hundred to one hundred and fifty by two hundred and fifty microns in cross-section, the diaphragm plate 40 is typically about one hundred to one hundred and twenty-five microns thick, the ink chamber wall 18 is typically about fifty to one hundred and thirty microns thick, the external air chamber wall is typically about one hundred to two hundred microns thick, and the distance between plates 40 and 34 is about one hundred to two hundred and fifty microns.

With relatively small dimensions such as described above, or as typically found in other types of ink jet print heads, it is readily apparent that any manufacturing process must be designed in a way to minimize the possible occlusion or even partial obstruction of these various ink jet print head orifices and passageways. In addition, misalignment, bending, rotation, and distortion of the plates 18, 20, and 40 as well as of other ink jet print head components during manufacture can interfere with the proper operation of an ink jet print head. For example, misalignment of the various laminates forming the passageways, and especially between orifice 22 and 24, can result in nonfunctional ink jet print heads. Also, bending or distortion of the plate 18, as well as of plate 20 in the case of air-assisted ink jet print heads, can alter the direction at which ink droplets are ejected from the ink jet orifice 22, thereby interfering with th ink jet print head performance. In addition, significant distortions of either plate 18, plate 20 or plate 40 can result in these plates touching one another or otherwise blocking air chamber 16 in whole or in part. Again, ink jet print head manufacturing processes must be designed to minimize distortion of the various components and any misalignment of the apertures.

PRELIMINARY PROCESSING OF INK JET PRINT HEAD COMPONENTS

The metal components to be bonded together in accordance with the method of the present invention are selected to have closely similar or nearly identical coefficients of thermal expansion so that these components do not distort relative to one another as they are bonded. In corrosive environments frequently encountered by operating ink jet print heads, due to the corrosive nature of some inks, stainless steel is the preferred material for ink jet print heads. When corrosion is not significant, for example when less corrosive inks are used, copper, nickel and other metals may be used for the substrates or components.

Figure 2:
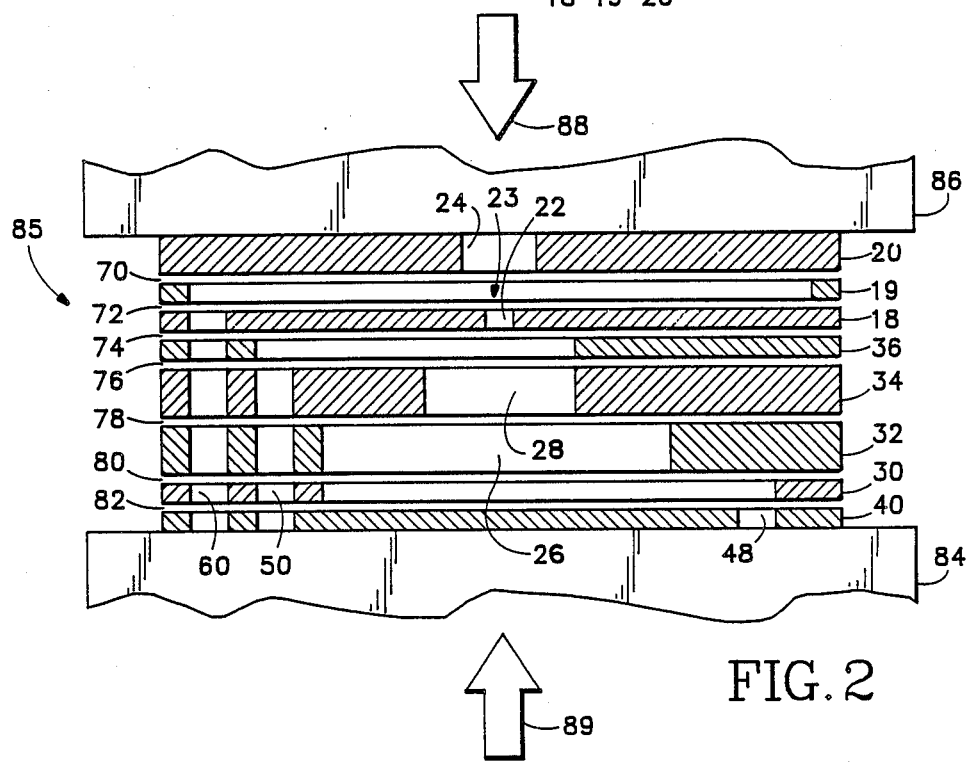
FIG. 2 is a schematic illustration of components of an ink jet print head in position for the application of pressure during a manufacturing step of the method of the present invention.

The individual ink jet print head components 18, 19, 20, 30–36 and 40, as shown in FIG. 2, are initially processed in a conventional manner to provide the orifices and passageways 22, 24, 48, 50, 60 and the chambers 26, 28. Although not required, each of these orifices, passageways and chambers are typically pre-formed by chemical milling, punching, blanking, electron discharge machining or another such process. Although the particular pieces need not be laminar, particularly good bonds can be achieved when the adjoining surfaces of the components are planar. This facilitates the ability to compress the surfaces together wherever they are to be bonded.

The surfaces to be joined are typically smooth. For example, surface finishes of sixteen microinches or better for machined parts and a 2B finish for stainless steel sheet stock are usually used. In general, strong, hermetic bonds are consistently achieved when the starting materials have surfaces finished to this degree of smoothness.

Standard cleaning techniques are employed to initially clean the ink print head components to remove dirt and oil. For example, the components can be rinsed in acetone, in trichloroethylene, in a soap plus ammonia in water mixture, and then rinsed in clean water. After this, the components may be vapor degreased in freon. Once the components are thoroughly degreased, the surfaces are prepared for the placement of a layer of filler material.

For stainless steel components, and after the above cleaning has been performed, a Shipley's Electroclean material can be used for cleaning purposes with the parts being run slightly anodic. After rinsing the pieces in deionized water, the stainless steel components can be placed directly into a very low pH metal strike solution, with either a gold or nickel strike being suitable examples. One gold strike that works well is AuroBond TCL made by Sel Rex Company of Nutleg, N.J. Typically the strike material is one-tenth to one-eighth micron thick. These processes both clean and remove the surface oxide sufficiently well that the strike metal bonds well to the components. The pieces can then be rinsed in deionized water for subsequent placement of a filler material as explained below.

Stainless steel forms a tenacious oxide on its surface when exposed to air. This oxide is substantially removed prior to the brazing step explained below. The end result of the previously described cleaning and application of the metal strike are components in which this oxide is satisfactorily removed. The cleaning and strike approach set forth above eliminates the need for a preassembly bake of the various components in hydrogen. Also, better adhesion of submicron plated filler materials to the components can thereafter be achieved.

It should also be noted that the use of a strike material is an efficient way of preventing the reformation of oxide on stainless steel, but that strike materials are not mandatory. In addition, other approaches for the removal of oxides will be apparent to those skilled in the art. For example, although less desirable, oxides can also be removed from stainless steel components after the deposition or placement of filler materials on the components. This can be accomplished by baking the components, at a temperature below the melting point of the filler material, in a hydrogen furnace to reduce the oxide. In addition, when substrate materials such as copper and nickel are used, oxide formation is not as significant a problem as in the case of stainless steel.

FILLER MATERIAL

In accordance with the method of the present invention, a layer of filler material is placed on at least one of the surfaces. When submicron layers of filler material are being used, only one of the surfaces need be coated with the filler material, although both surfaces can be coated if desired. The filler material may be placed on the surfaces in a variety of ways including sputtering, vacuum deposition, electroplating and the like. In addition, very thin gold foil, such as two microns in thickness, can be made and placed between the surfaces to be joined. However, the preferred approach is electroplating as, especially when stainless steel components are being processed, a strongly adhering plated layer of filler material can be placed on at least one of the surfaces to be joined.

In addition, the filler material is typically, although not necessarily, selected to have an affinity for diffusing into the substrate material used for the components. The process, however, can also be used with a filler material which resists diffusion into the substrate. In such a case, the diffusion resistant material is limited to no more than about one micron. For example, the process has been successfully performed using silver or silver inclusive (i.e. copper-silver, gold-silver, etc.) filler materials on stainless steel even though silver does not have an affinity for diffusion into the stainless steel. In such a case, the silver or diffusion resistant portion of the filler material has been maintained at no more than about one micron. When more than about one micron of silver was used in the filler material, some problems have been encountered with the silver flowing into and occluding passageways in the ink jet print heads.

Although not limited to this group, the filler materials are preferably selected from a group comprising gold, silver, copper, nickel and any binary and ternary combinations of these materials. Such binary and ternary combinations include gold-silver, copper-silver, gold-copper-silver and so forth. In addition, other materials, such as zinc and phosphorus (i.e. nickel-phosphorus, six to twelve percent phosphorus by weight), may be added to these filler materials and still fall within this group. The filler materials may take the form of alloys or, where electroplating is used, may be typically placed in layers on one or both surfaces to be joined. The filler materials other than gold and silver are typically used if corrosion resistance is less important and if facilities are available to do the brazing step, set forth below, either in a vacuum or a very clean and dry hydrogen atmosphere.

The filler materials are selected to have a melting point which is below the melting point or points of the components being joined together. For example, a silver inclusive filler material can be used for bonding copper components. Nickel and stainless steel components, in contrast, are typically bonded using the filler materials set forth above. In this application gold and copper are particularly suitable bonding materials for stainless steel because they diffuse rapidly into the stainless steel components.

In order to minimize the occlusion of the small orifices and other features in the components during the brazing step of the process, it is important to use both a minimal amount of filler material and any strike material and to choose the appropriate filler material. Otherwise, when this filler material liquifies and flows during brazing, the various components may move relative to each other. The relatively low brazing pressure used in the process, as explained below, also assists in maintaining spacings between the various ink jet print head components to micron accuracies and in keeping the relative alignment of the components to these same accuracies.

Preferably, the total amount of filler material, excluding any strike material that may be present unless the strike material is performing the function of the filler material, between the surfaces being joined should be in the range of from approximately one-sixteenth micron to approximately two microns. Filler materials in this range permit rapid ink jet print head manufacture and result in ink jet print heads with high tensile strength bonds. However, the total thickness of the filler material may be increased to approximately five microns.

However, if these larger amounts of filler material are used, the brazing step requires a relatively long time. This time is required in order to melt and partially diffuse the excess filler material into the components during brazing. Again, if the filler material is of a substance or includes a substance which does not diffuse into the component substrate, as is the case for silver filler material and stainless steel components, then the amount of the diffusion resistant portion of the filler material should be limited to approximately no more than about one micron.

With approximately one-eighth micron total of filler material, hermetic bonds measuring about two-thirds of the full tensile strength of the substrate material have been achieved using this method for both silver and gold based filler materials and stainless steel substrates. Similar bonds are expected with other substrates and filler materials. In addition, satisfactory bonds are expected with gold and silver based filler materials plated to a total thickness of one-sixteenth micron between the surfaces being joined. However, these bonds would have approximately only one-half of the full tensile strength of the substrate material. Higher pressures during brazing and better surface finishes can compensate somewhat to produce stronger bonds when this slight amount of filler material is used, but these processes become more expensive. Thus, approximately about one-sixteenth micron of total filler material represents a lower limit at which satisfactory bonding can be achieved using this bonding method. In addition, with a silver inclusive filler material on stainless steel, the risk of puddling of the silver and occlusion of the orifices by the silver starts to increase as the silver portion of the filler material exceeds one-half micron. Therefore, it is desirable to keep silver inclusive filler materials, or other diffusion-resistant filler materials for other substrates, at even less than a one micron thickness. Adequately strong and hermetic bonds without occlusion can be achieved with filler materials ranging from one-eighth micron to one-half micron. In addition, occlusion has not been noticed to be a problem when gold is used as a filler material at up to approximately about two microns. In addition, because gold diffuses relatively rapidly into stainless steel during brazing and is relatively inert, rapidly formed, strong bonds can be achieved using gold even with somewhat higher amounts of filler material.

Since very small amounts of filler material are used, the cost of the filler material used during manufacture of an ink jet print head is a small fraction of the cost of the head even when gold is the selected material. With gold as the filler material and a total plating thickness of only one-half of a micron, gold fillets in the orifices are typically hard to detect, even at one hundred times magnification. Again, silver tends to "puddle-up" more than gold when bonding stainless steel components and thus tends to occlude small passages in whole or in part unless sub-micron amounts are used. The use of silver filler material during manufacturing is marginally less expensive per component, forms a strong brazed joint at a temperature of about 100° C. lower than gold and thus offers some advantages. Intermediate in all respects between gold and silver are filler materials composed of various ratios of gold and silver. Finally, the other filler materials can be used as desired.

FIG. 2 shows the ink jet print head of FIG. 1 during an intermediate manufacturing step with the filler layers 70 through 82 (exaggerated in this figure) positioned between the respective pairs of laminates 19 and 20, 18 and 19, 36 and 18, 34 and 36, 32 and 34, 30 and 32, and 40 and 30.

In the central region of the diaphragm plate 40 that forms the wall of the ink chamber 28, and which is not subjected to pressure during brazing, the filler layer 82 has a tendency to collect or puddle. Although in many cases this puddling does not present a significant problem, it can interfere with ink jet print head operation. This collection of filler material on the diaphragm plate is minimized when filler material layer 82 is limited to approximately about one-eighth micron or if the filler material is eliminated entirely on the diaphragm layer and only the strike material is used on this layer, with the filler material being present on the adjoining surfaces of component 30.

BRAZING STEP

During the brazing portion of the process, the surfaces to be joined are placed together in abutting relationship. These surfaces can be given a final vapor degreasing step prior to being positioned against one another. The abutting surfaces are placed under pressure of from about one-half psi to one hundred psi with ten psi being preferred. As the pressure increases, fixturing becomes somewhat more difficult. Heat is then applied to melt the filler material and braze the components together. Typically, brazing is accomplished in a furnace having either a hydrogen atmosphere, or a vacuum.

As shown in FIG. 2, the several layers or components to be bonded are stacked together and aligned to the desired accuracy. The stack in FIG. 2 has been placed in a pressure fixture 85 comprised of first and second platens 84, 86. These platens are used to apply force in the direction indicated by arrows 88, 89 which passes through, and typically is generally normal to, the surfaces being bonded. In general, any pressure application fixture may be used which does not distort the components due to thermal expansion mismatches during heating of the components to the braze temperature and during application of pressure during the brazing.

The components can be temporarily tack welded at the edges or otherwise secured to hold them in alignment while being positioned in the bonding fixture 85. Also, the fixture 85 may include alignment pins, not shown, against which the component pieces are placed to position the components in alignment prior to brazing. Other alignment fixturing typically used in brazing may also be used.

The fixture 85 may have platens 84 and 86 of a material with the same or a similar coefficient of thermal expansion as that of the components being joined. For example, platens 84 and 86 may be of stainless steel when stainless steel components are being bonded. As the fixture and components heat, distortion is virtually eliminated because the platens 84 and 86 expand at the same rate as the components. Alternatively, prior to the application of any pressure, the platens and components being joined may be first heated to a temperature below the braze temperature with pressure thereafter being applied. Prior to cooling the components, the pressure is removed. With this latter approach, the coefficient of thermal expansion of the platens 84 and 86 need not be the same as that of the components of the ink jet print head. Differences in coefficients of thermal expansion between the platens and components is not a problem in this case because the temperature of the platens and components is not varied while pressure is being applied.

Also, because of the low pressures involved, especially if the pressure is about ten psi or less, the pressure can be applied by simply loading the components with a dead weight which applies the appropriate pressure. The weight can be of the same material as the components, in which case there is no variation in the coefficient of thermal expansion between the weight and components. Also, a simple alignment fixture can be used to maintain the components in alignment during brazing with this dead weight load.

The brazing step may be performed simultaneously on all layers of an ink jet print head to be bonded. Alternatively, the steps leading to and including the brazing of components can be separately applied to groups of the components (i.e. laminates 20, 19, and 18 in one group, laminates 32, 34, and 36 in a second group, and laminates 30 and 40 in a third group) with the groups of braze bonded components being thereafter brazed. Thus, multiple braze steps may be performed in accordance with the present invention. If all of the filler material has been used in one of the steps, then it may be necessary to replate the surfaces with additional filler material before a subsequent bonding process.

During brazing, the components are first heated to a temperature of slightly below the melting point of the filler material and held there for time sufficient for the temperature of all the components to stabilize. Also, the components may be held at this temperature until all but about one micron of filler material has diffused into the substrate. For example, if stainless steel components and gold or silver or copper inclusive filler materials are used, the components are heated to from about 900° C. to 950° C. Generally about four minutes at this temperature for typical ink jets is a sufficient amount of time for the parts to stabilize if no more than about one micron of filler material is used. The temperature is then raised to just above the melting point of the filler material to melt the filler material and complete the braze. Two to four minutes at a temperature above the melting point of the filler material is generally sufficient for brazing when about two microns or less of gold or other filler material is used. With greater amounts of braze material (i.e., five microns), the components may be held slightly below or at the braze temperature for a longer time to promote diffusion of the filler material into the adjoining components. Finally, the components are cooled quickly and removed from the furnace. Because of the low pressure brazing and small amounts of filler materials being used, no detectable geometric distortions or misalignments to a detection level of two microns have been observed in the bonded components.

In this braze process, unless a diffusion resistant filler material is being used such as silver filler material for stainless steel parts, most of the area of each joint exhibits no unalloyed filler material. If the braze temperature is maintained for longer times, then all of the filler material may diffuse away from the joint area and the grain structure of the adjacent substrate layers may form across the joint. In laboratory testing of an ink jet print head made in accordance with this process, there was no instance of joints that leaked ink, and all the joints that were leak checked with a helium leak detector were hermetic.

The braze step of the process results in adequately strong, hermetic bonds between all surfaces in contact. Because of the relatively thin filler materials present between the components during brazing, alignment of the components is maintained, as they do not tend to shift as the filler material melts. In addition, the low pressure brazing operation does not introduce distortion or bending of the components.

More specifically in an ink jet print head manufactured in accordance with the process of the present invention, no distortion of the laminates forming the ink jet print head could be detected to the one to two micron detection level of equipment used for detecting this distortion. Moreover, the concentric alignment of orifices in the ink jet print head components did not deviate, within the one to two micron detection level, from the alignment that was present prior to the bonding of these components. In addition, spacing between adjoining components of the ink jet print heads was maintained to this detection level. The bonds resulting from this process prevent cracks between components and delaminations of components which could trap bubbles and adversely affect ink jet print head performance. Furthermore, occlusion of small apertures, for example the ink jet orifices, was substantially eliminated. Therefore, the present invention constitutes a high-yield ink jet print head manufacturing method.

Having illustrated and described the principles of our invention with respect to several preferred embodiments, it will be apparent to those skilled in the art that the invention may be modified in arrangement and detail without departing from the principles thereof. We claim as our invention all such modifications as come within the true spirit and scope of the following claims.

We claim:

1. A method of bonding a first surface of a first metal component of an ink jet print head having at least a first preformed aperture to a second surface of a second metal component of the ink jet print head having at least a second preformed aperture, the first and second components being of materials having the same or similar coefficients of thermal expansion, the first and second surfaces being bonded together with the first aperture in alignment with the second aperture, the method comprising:
   placing a layer of a filler material on at least one of the surfaces, the filler material having a melting point which is below the melting points of the first and second components, the total thickness of the filler material on the first and second surface together being in the range of from approximately one-sixteenth micron to approximately five microns;
   aligning the first and second apertures with the first and second surfaces abutting one another;
   loading the components with a pressure of from about one-half psi to no more than about one hundred psi in a direction passing through the first and second surfaces to press the first and second surfaces together; and
   melting the filler material while the components are loaded with the pressure without melting the first and second components to braze the first and second components together with the first aperture in alignment with the second aperture.

2. A method according to claim 1 in which the placing step comprises the step of placing a filler material selected from a group comprising gold, copper, silver, nickel, and any binary and ternary combinations of said materials with themselves and with other materials.

3. A method according to claim 2 in which the placing step comprises the step of placing a filler material which is selected form the group comprising silver, gold-silver, gold-copper-silver and copper-silver, the placing step also comprising the step of placing a total thickness of the silver portion of the filler material on the first and second surfaces together of no greater than approximately one micron, the first and second components being of stainless steel and the method including the step of removing oxide from the first and second surfaces prior to the brazing step.

4. A method according to claim 2 in which the placing step comprises the step of placing a filler material of a total thickness of from approximately one-eighth micron to one-half micron.

5. A method according to claim 1 in which the placing step comprises the step of placing a filler material of a total thickness of no less than approximately one-eighth micron.

6. A method according to claim 1 including the steps of cleaning the first and second surfaces and of plating such surfaces with a strike material prior to placing a layer of filler material, and in which the placing step comprises the step of plating the filler material on at least one of the first and second surfaces.

7. A method according to claim 6 in which the first and second components are of stainless steel and including the step of removing oxide from the first and second surfaces prior to plating the filler material.

8. A method according to claim 1 in which the loading step comprises the step of loading the components with no more than about ten psi of pressure.

9. A method of bonding a first surface of a first metal component of an ink jet print head having at least a first preformed aperture to a second surface of a second metal component of the ink jet print head having at least a second preformed aperture, the first and second components being of stainless steel, the first and second surfaces being bonded together with the first aperture in alignment with the second aperture, the method comprising:

(a) cleaning the first and second surfaces and plating such surfaces with a strike material, thereby removing oxide from the first and second surfaces;

(b) plating a layer of a filler material on at least one of the strike coated first and second surfaces, the filler material being selected from a group comprising gold, copper, nickel-phosphorus and any binary and ternary combination of such materials, the total thickness of the filler material on the first and second surfaces together being no greater than approximately two microns;

(c) aligning the first and second apertures with the first and second surfaces abutting one another;

(d) loading the components with a pressure of, from about one-half psi to no more than about one hundred psi in a direction passing through the first and second surfaces to press the first and second surfaces together; and (e) melting the filler material while the components are loaded with the pressure without melting the first and second components to braze the first and second components together with the first aperture in alignment with the second aperture.

10. A method according to claim 9 in which the filler plating step comprises the step of plating a total thickness of the filler material of from approximately one-eighth micron to one-half micron.

11. A method according to claim 9 in which the loading step comprises the step of loading the components with no more than about ten psi of pressure.

12. A method of bonding a first surface of a first metal component of an ink jet print head having at least a first preformed aperture to a second surface of a second metal component of the ink jet print head having at least a second preformed aperture, the first and second components being of stainless steel, the first and second surfaces being bonded together with the first aperture in alignment with the second aperture, the method comprising:

(a) cleaning the first and second surfaces and plating such surfaces with a strike material, thereby removing oxide from the first and second surfaces;

(b) plating a layer of a filler material on at least one of the surfaces, the filler material being selected from a group comprising silver, gold-silver, gold-copper-silver and copper-silver, the plating step comprising the step of plating a total thickness of the silver portion of the filler material on the first and second surfaces together of no greater than approximately one micron;

(c) aligning the first and second apertures with the first and second surfaces abutting one another;

(d) loading the components with a pressure of from about one-half psi to no more than about one hundred psi in a direction passing through the first and second surfaces to press the first and second surfaces together; and (e) melting the filler material while the components are loaded with the pressure without melting the first and second components to braze the first and second components together with the first aperture in alignment with the second aperture.

13. A method according to claim 12 in which the filler plating step comprises the step of plating a total thickness of the filler material of from approximately one-eighth micron to one-half micron.

14. A method according to claim 12 in which the loading step comprises the step of loading the components with no more than about ten psi of pressure.

* * * * *